United States Patent [19]
Kobayashi

[11] Patent Number: 5,806,777
[45] Date of Patent: Sep. 15, 1998

[54] APPARATUS HAVING CASSETTE LID OPENING MECHANISM FOR PLURALITY OF CASSETTES OF DIFFERENT SIZES

[75] Inventor: Junji Kobayashi, Tokyo, Japan

[73] Assignee: Canon Kabushiki Kaisha, Tokyo, Japan

[21] Appl. No.: 783,319

[22] Filed: Jan. 15, 1997

Related U.S. Application Data

[63] Continuation of Ser. No. 304,376, Sep. 12, 1994, abandoned.

[30] Foreign Application Priority Data

Sep. 20, 1993 [JP] Japan .................................. 5-233303

[51] Int. Cl.$^6$ ........................... G11B 23/04; G11B 5/008
[52] U.S. Cl. ........................... 242/336; 242/338; 360/94
[58] Field of Search .................................. 242/336, 338, 242/338.2; 360/94, 96.5

[56] References Cited

U.S. PATENT DOCUMENTS

| | | | |
|---|---|---|---|
| 4,796,117 | 1/1989 | Fleck | 360/96.5 |
| 5,161,079 | 11/1992 | Ohshima et al. | 360/132 |
| 5,386,329 | 1/1995 | Ikegawa | 360/96.5 X |

*Primary Examiner*—John Q. Nguyen
*Attorney, Agent, or Firm*—Robin, Blecker & Daley

[57] ABSTRACT

In an apparatus which is capable of selectively using a plurality of cassettes of different sizes, a cassette lid opening mechanism includes a first opening member arranged to open the lid of a first cassette by abutting on the lid when the first cassette is inserted into the apparatus, a second opening member arranged to open the lid of a second cassette which is smaller than the first cassette by abutting on the lid when the second cassette is inserted into the apparatus, and a moving mechanism arranged to move the second opening member when detecting the first cassette.

16 Claims, 11 Drawing Sheets

APPARATUS HAVING CASSETTE LID OPENING MECHANISM FOR PLURALITY OF CASSETTES OF DIFFERENT SIZES

This is a continuation application under 37 CFR 1.62 of prior application Ser. No. 08/304,376, filed Sep. 12, 1994, abandoned.

BACKGROUND OF THE INVENTION

1. Field of the Invention

This invention relates to an apparatus arranged to be capable of using any of a plurality of cassettes of different sizes and more particularly to a cassette lid opening mechanism of the apparatus.

2. Description of the Related Art

The apparatuses of the kind mentioned above include video cassette recorders (hereinafter referred to as VCRs). Cassettes containing tapes for use by VCRs have been arranged in various sizes according to the purposes of their use. Apparatuses which are capable of using such cassettes of different sizes have also been contrived.

However, the conventional apparatuses of this kind have been provided with all cassette lid opening members that respectively correspond to the cassettes of different sizes usable by the apparatus. The positions of all the cassette lid opening members arranged to abut on the lids of different cassettes are fixedly disposed within the apparatus. To prevent a cassette lid opening member which corresponds to a smaller cassette from interfering a larger cassette inserted into the apparatus, therefore, it has been necessary to provide some cutout part in the larger cassette.

With the cassette provided with the cutout part, however, some guide post must be arranged within the cassette to cause the tape to make a detour to avoid the cutout part in such a way as to prevent the opening member inserted into the cutout part from coming into contact with the tape. Such arrangement not only causes an increase in cost of the cassette but also tends to increase factors of varying the tension of the tape and thus might deteriorate the performance of the apparatus. These problems have prevented such arrangement from being put into practice.

Further, since these opening members are located in the neighborhood of an opening provided in the cassette for moving the tape into and out of the cassette, their presence tends to be impedimental to design work on the path of the tape.

SUMMARY OF THE INVENTION

In view of the problems mentioned above, it is an object of this invention to provide a cassette lid opening mechanism which is capable of opening the lids of cassettes of different sizes by means of members dedicated for this purpose and is arranged to allow more latitude to design work on a tape path without necessitating any additional cutout part in a cassette containing the tape.

To attain the above-stated object, a cassette lid opening device usable for a plurality of cassettes of different sizes is arranged according to this invention to include a first opening member arranged to open a lid of a first cassette by abutting on the lid of the first cassette, a second opening member arranged to open a lid of a second cassette which is smaller than the first cassette by abutting on the lid of the second cassette, and moving means for moving the second opening member when detecting the first cassette.

To attain the object from another point of view, a device for opening a lid of a cassette is arranged according to this invention to include a lid opening member arranged to be swingable with one end part thereof pivotally supported and to open the lid of the cassette with the other end part thereof coming to abut on the lid, and a detecting member arranged to be swingable with one end part thereof pivotally supported and to have the other end part thereof engaging the lid opening member, the one end part of the detecting member having a portion formed to protrude farther toward the mounted cassette than the one end part of the lid opening member.

To attain the object from a further point of view, an apparatus capable of selectively using a plurality of cassettes of different sizes is arranged according to this invention to includes a cassette mounting mechanism arranged to permit a selected cassette to be mounted into the apparatus by acting according to the size of the selected cassette, and a cassette lid opening mechanism including a first opening member arranged to open a lid of a first cassette by abutting on the lid of the first cassette when the first cassette is inserted into the apparatus, a second opening member arranged to open a lid of a second cassette which is smaller than the first cassette by abutting on the lid of the second cassette when the second cassette is inserted into the apparatus, and moving means for moving the second opening member when detecting the first cassette.

The above and further objects and features of this invention will become apparent from the following detailed description of embodiments thereof taken in conjunction with the accompanying drawings.

DETAILED DESCRIPTION OF THE PREFERRED EMBODIMENTS

The arrangement of embodiments of this invention is described with reference to the drawings as follows: In the cases of the embodiments, this invention is applied to a magnetic recording and/or reproducing apparatus of the kind for recording and/or reproducing information on or from a magnetic tape with a head mounted on a rotary drum.

Figure 1:
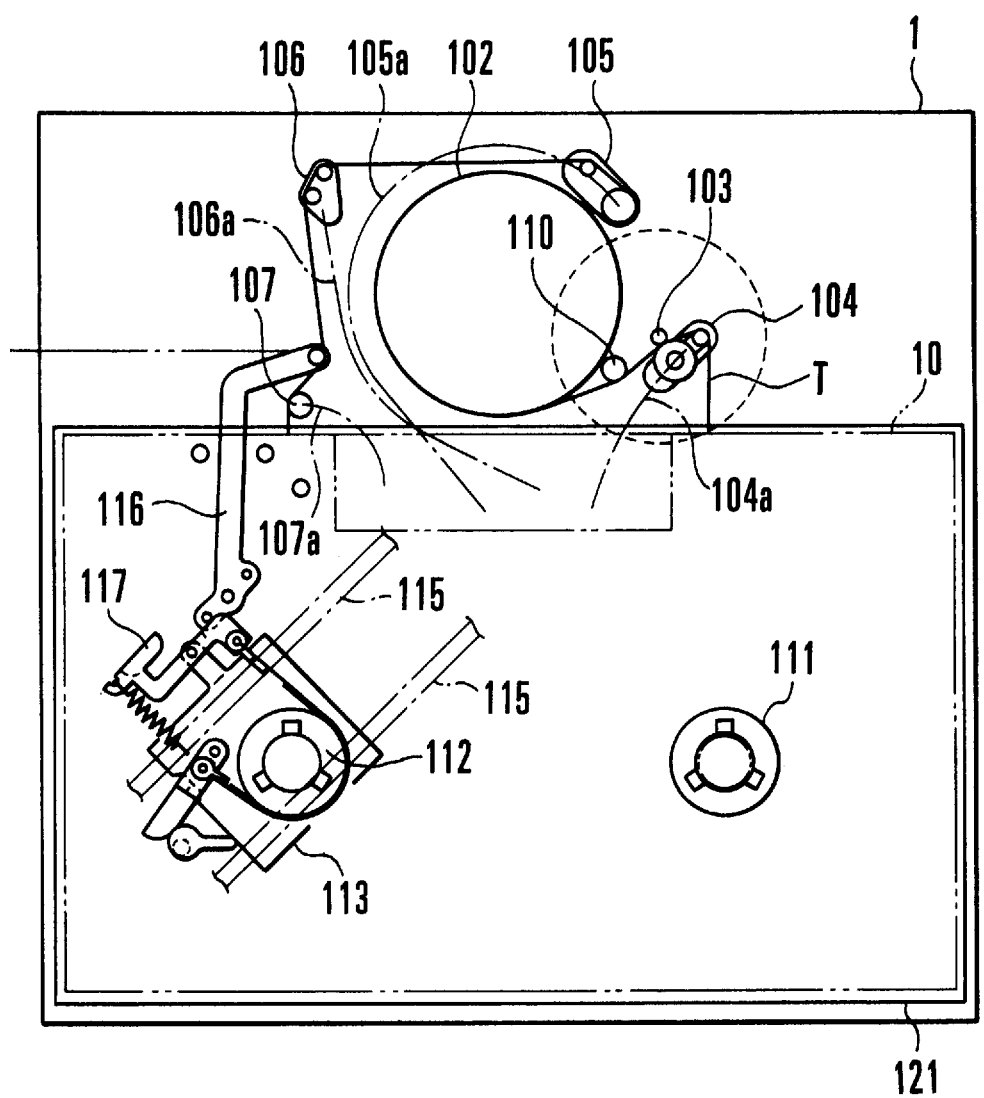
FIG. 1 is a plan view showing by way of example a recording and/or reproducing apparatus to which a cassette lid opening mechanism arranged according to this invention is a plied, the apparatus being shown in a state where a large cassette is mounted.

FIG. 1 shows in outline the arrangement of the magnetic recording and/or reproducing apparatus. The illustration includes a chassis 1, a rotary drum 102 which is placed on the chassis 1, a capstan 103, a pinch skate 104 on which a pinch roller is placed, a leading skate 105, a trailing skate 106 and a cassette post 107. The pinch skate 104, the leading skate 105, the trailing skate 106 and the cassette post 107 are arranged to be movable along their respective paths 104a, 105a, 106a and 107a, so that as shown in FIG. 1, a tape T which is pulled out from a large cassette 10 mounted on the chassis 1 is wrapped around the rotary drum 102 and a post 110 disposed on an exit side.

Figure 2:
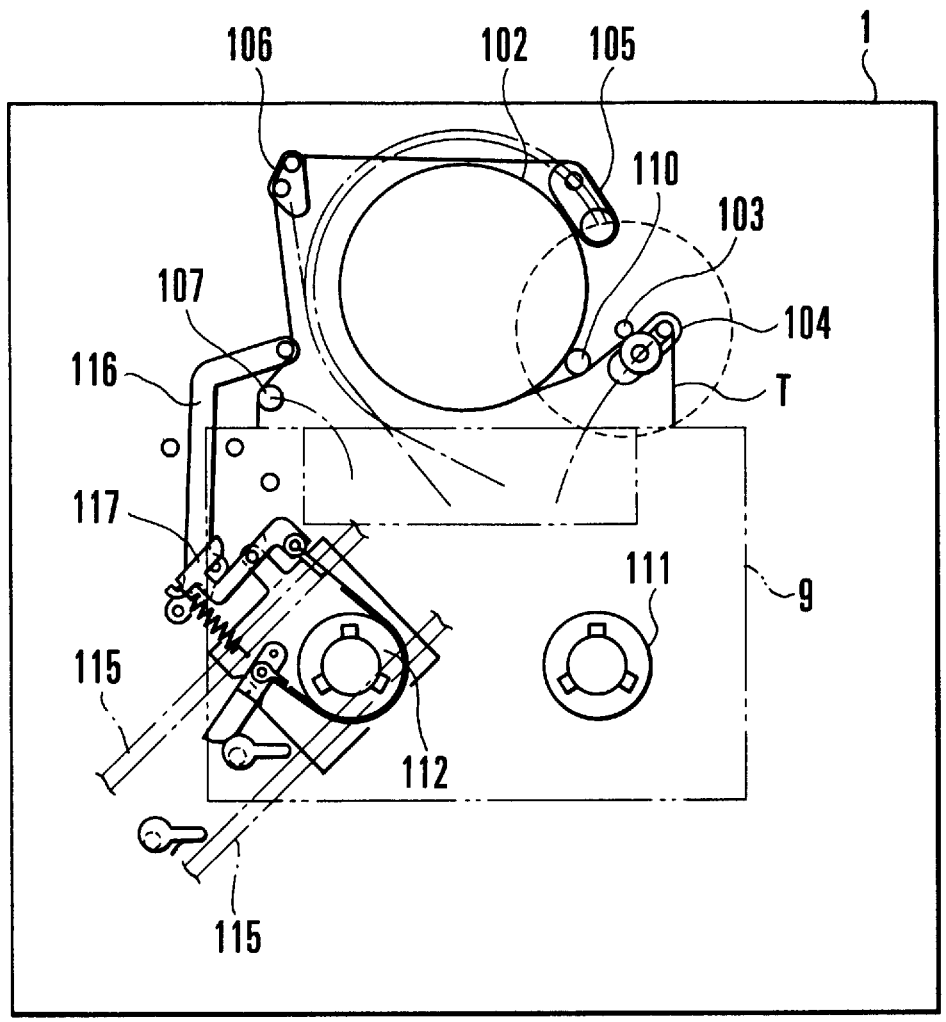
FIG. 2 is a plan view showing the recording and/or reproducing apparatus of FIG. 1 in a state where a small cassette is mounted.

A take-up reel mount 111 is placed on a take-up reel mount base which is not shown. A supply reel mount 112 is placed on a supply reel mount base 113. Referring to FIG. 2, the take-up reel mount base and the supply reel mount base 113 are movable along rails 115 for a small cassette 9 when the small cassette 9 is mounted on the chassis 1. The large cassette 10 which is shown in FIG. 1 and the small cassette 9 which is shown in FIG. 2 thus can be set in their respective predetermined positions.

The cassette 10 or 9 is inserted and held within a cassette holder 121 (FIG. 1) when the cassette holder 121 is in a raised position. When the cassette holder 121 descends, the cassette 10 or 9 is mounted on the reel mounts 111 and 112. When the cassette holder 121 is descending, the lid of the cassette 10 or 9 is opened by a cassette lid opening mechanism which is arranged as described below:

First Embodiment

Figure 3:
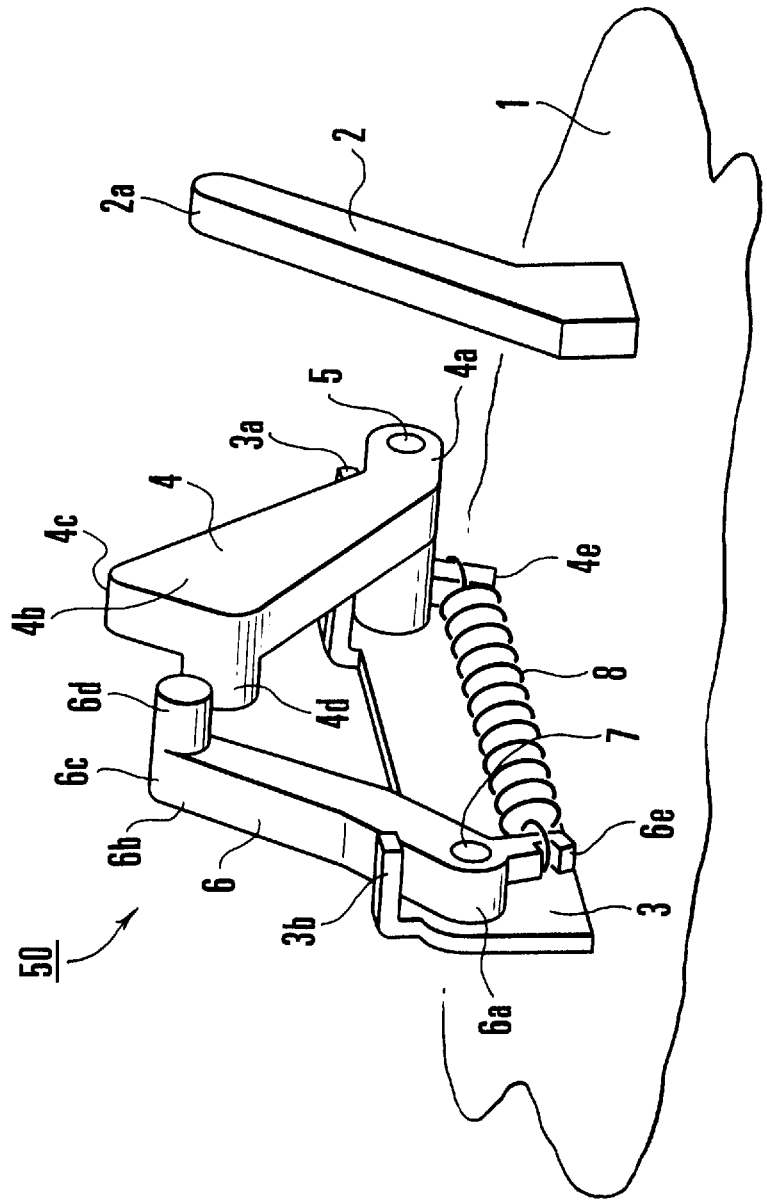
FIG. 3 is an oblique view showing the essential parts of a first embodiment of this invention.

FIG. 3 shows the essential parts of a first embodiment of this invention. A first opening member 2 is secured to the upper surface of the chassis 1. When the cassette holder 121 which is shown in FIG. 1 is in a lowered state, a fore end part 2a of the first opening member 2 engages a lid 10a of the large cassette 10, as shown in FIG. 4(b).

Figure 4A:
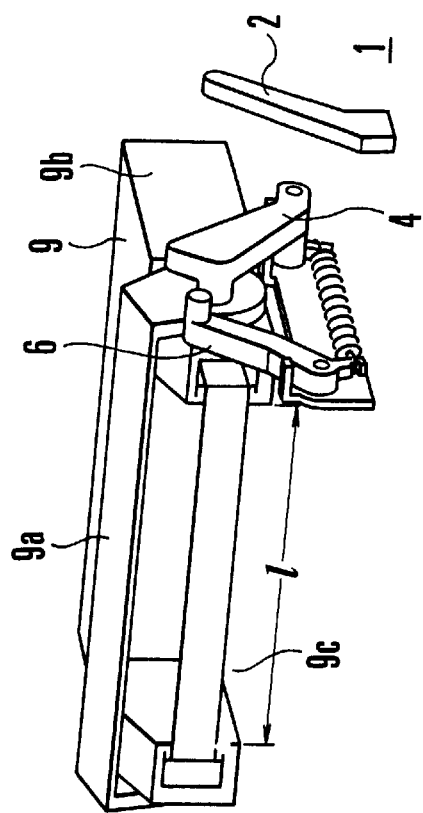
FIGS. 4(a) and 4(b) are oblique views showing in outline the small and large cassettes in their states of having their lids being opened, respectively.

A small-cassette lid opening mechanism 50 which represents a feature of this invention is described as follows: Referring to FIG. 3, a fitting base 3 is secured to the chassis 1. A shaft 5 is secured to the fitting base 3. One end part 4a of a large-cassette detecting lever 4 is pivotally supported by the shaft 5. A bent part 3a which protrudes from an upper right end part of the fitting base 3 is arranged to limit the clockwise swinging movement of the large-cassette detecting lever 4, as viewed from the right-hand side in FIG. 3. The large-cassette detecting lever 4 is disposed in a position at a distance from the side face 9b of the small cassette 9, as shown in FIG. 4(a). However, an abutting part 4c which is formed at the other end part 4b of the large-cassette detecting lever 4 is arranged to be capable of abutting on the bottom face 10b of the large cassette 10, as shown in FIG. 4(b). This end part 4b also has an engaging part 4d formed to limit the clockwise swinging movement, as viewed from the right-hand side in FIG. 3, of a second opening member 6 which is arranged to abut on the lid 9a of the small cassette 9.

The second opening member 6 has one end part 6a thereof pivotally supported by a shaft 7 which is secured to the fitting base 3. The counterclockwise movement, as viewed from the right-hand side in FIG. 3, of the second opening member 6 is limited by a bent part 3b which protrudes from the upper left end part of the fitting base 3. The other end part 6b of the second opening member 6 has an abutting part 6c which is arranged to abut on the lid 9a of the small cassette 9 and an engaging part 6d which is arranged to engage the engaging part 4d of the large-cassette detecting lever 4 on the side of the second opening member 6 away from the side face 9b of the small cassette 9. Although it will be described later, the lid 9a of the small cassette 9 can be opened by the second opening member 6, as shown in FIG. 4(a), in a state where the engaging part 6d of the second opening member 6 is engaging the engaging part 4d of the large-cassette detecting lever 4. Further, the end part 4a of the large-cassette detecting lever 4 and the end part 6a of the second opening member 6 are respectively provided with lock parts 4e and 6e which protrude from these end parts. A coiled spring 8 is stretched between the lock parts 4e and 6e.

Figure 4B:
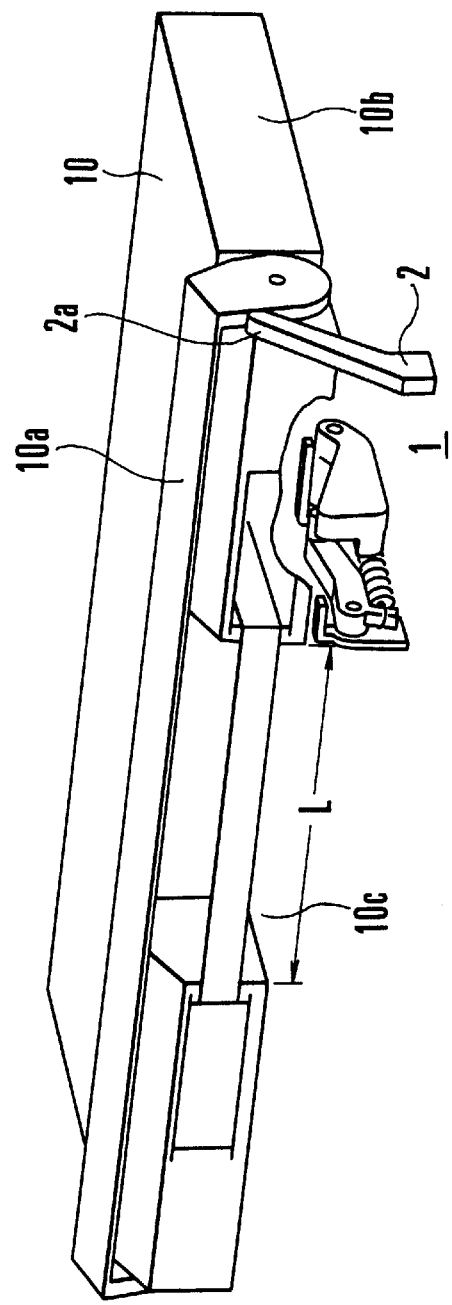

As shown in FIGS. 4(a) and 4(b), in the case of this embodiment, the respective lengths l and L of the opening parts 9c and 10c of the small and large cassettes 9 and 10 are arranged to be equal to each other. Therefore, the bottom face 10b of the large cassette 10 can be arranged to have a large area to allow the abutting part 4c of the large-cassette detecting lever 4 and the abutting part 6c of the second opening member 6 to abut on the bottom face 10b. Further, the arrangement of having the opening parts 9c and 10c to have the same length permits use of one and the same tape loading mechanism for both the cassettes 9 and 10 which are of different sizes.

Figure 5A:
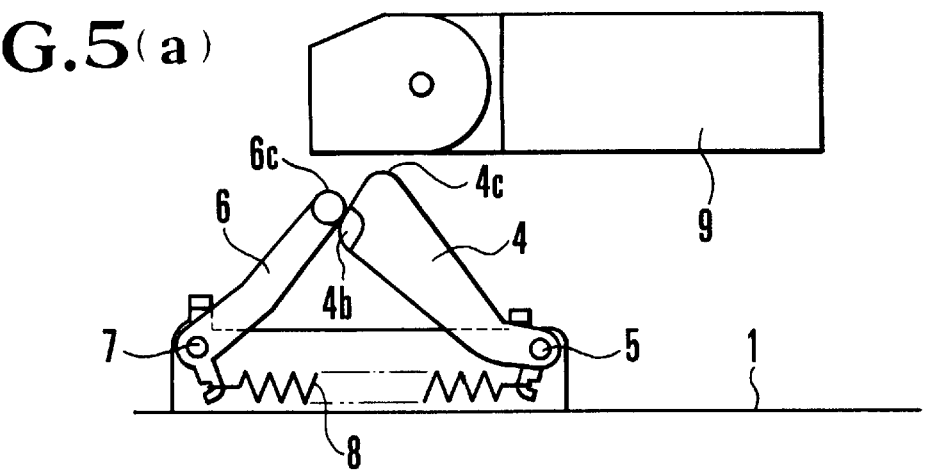
FIGS. 5(a) to 5(d) show the first embodiment as acting to open the lid of the small cassette.
Figure 5B:
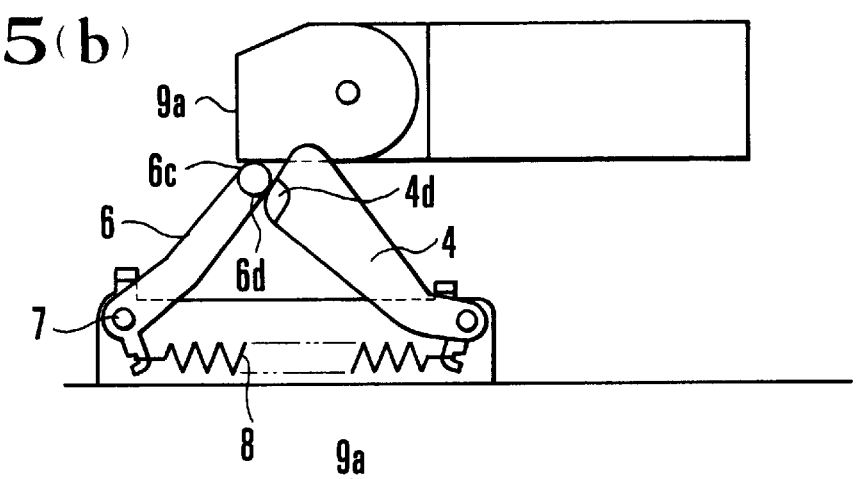

In mounting the small cassette 9 into the apparatus, the small-cassette lid opening mechanism 50 operates as described below with reference to FIGS. 5(a) to 5(d):

Referring to FIG. 5(a), the cassette 9 which is inserted into the cassette holder 121 (FIG. 1) moves downward, as viewed in FIG. 5(a), to be mounted on the reel mounts 111 and 112 which are disposed on the chassis 1 as shown in FIG. 1. The small cassette 9 then first comes to have its lid 9a abut on the abutting part 6c of the second opening member 6, as shown in FIG. 5(b). The abutting part 4c of the large-cassette detecting lever 4 then does not abut on the lid 9a. Further, although the second opening member 6 then tries to swing clockwise on the shaft 7 against the urging force of the spring 8, its engaging part 6d abuts on the engaging part 4d of the large-cassette detecting lever 4 to prevent the second opening member 6 from swinging.

Figure 5C:
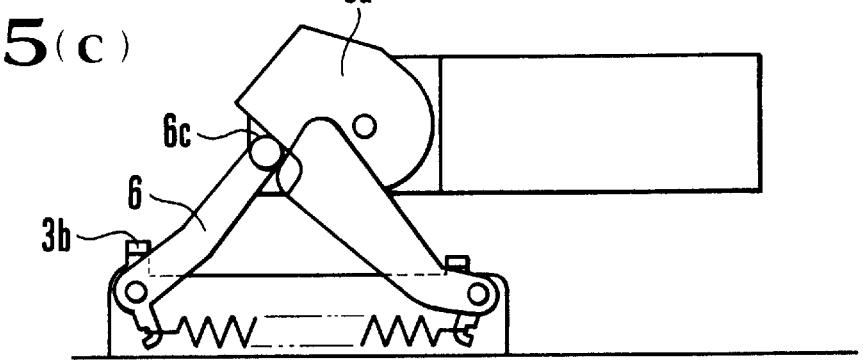
Figure 5D:
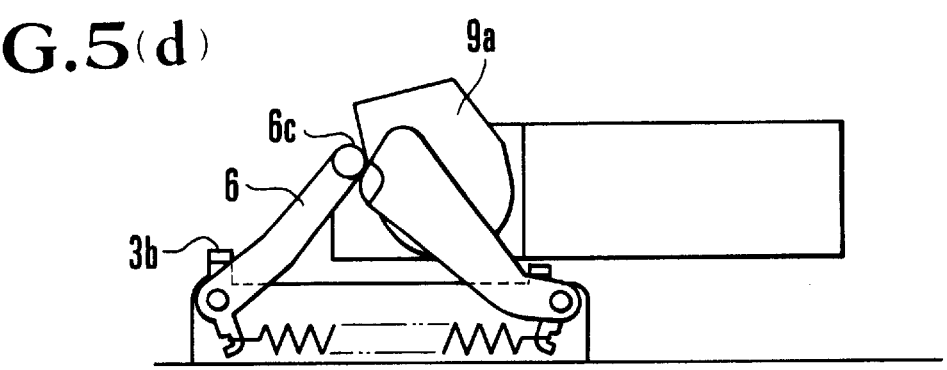

When the small cassette 9 further moves downward as viewed on the drawing from its position as described above, the lid 9a of the cassette 9 is pushed by the abutting part 6c to rotate clockwise, as shown in FIG. 5(c). When the cassette 9 moves still further downward, the lid 9a is fully opened with the cassette 9 mounted on the reel mounts 111 and 112, as shown in FIG. 5(d). While the small cassette 9 is moving from the position of FIG. 5(c) down to the position of FIG. 5(d), the second opening member 6 is pushed to move counterclockwise by its abutting relation to the lid 9a. However, this movement is limited by the bent part 3b of the fitting base 3.

Figure 6A:
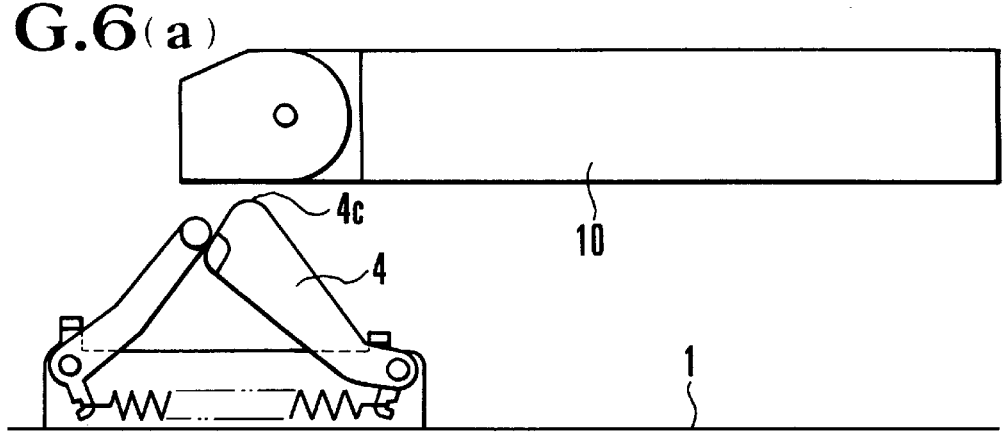
FIGS. 6(a) to 6(d) show the first embodiment as acting to open the lid of the large cassette.
Figure 6B:
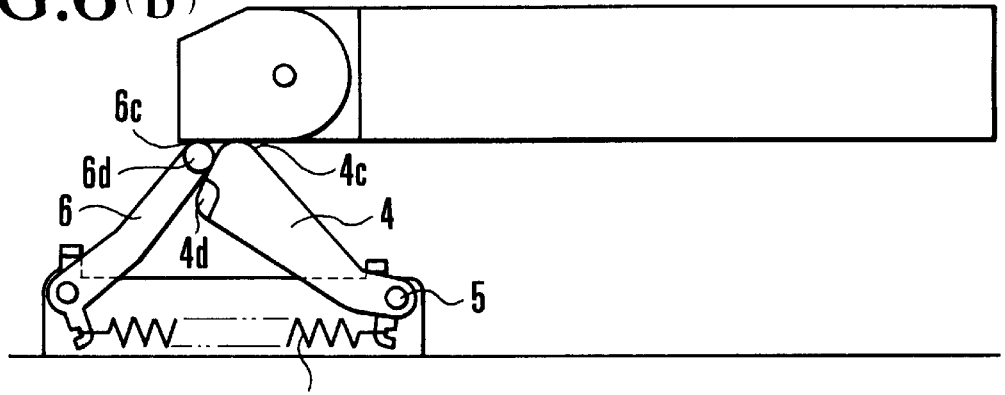
Figure 6C:
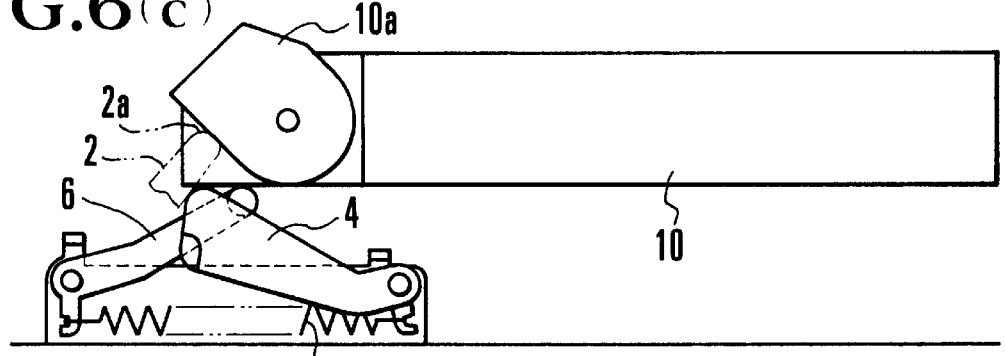
Figure 6D:
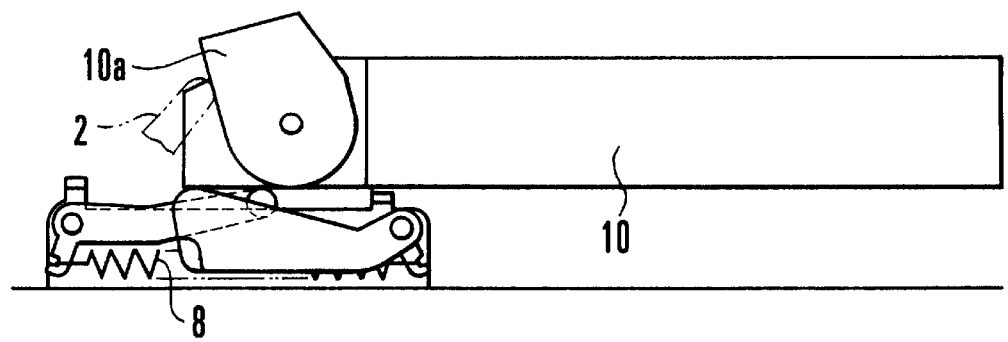

In mounting the large cassette 10 into the apparatus, the small-cassette lid opening mechanism 50 operates as described below with reference to FIGS. 6(a) to 6(d):

Referring to FIG. 6(a), the large cassette 10 which is inserted into the cassette holder 121 (FIG. 1) moves downward, as viewed in FIG. 6(a), to be mounted on the reel mounts 111 and 112 disposed on the chassis 1. The large cassette 10 then first comes to have its bottom face 10b abut on the abutting part 4c of the large-cassette detecting lever 4, as shown in FIG. 6(b). After that, the large-cassette detecting lever 4 swings counterclockwise on the shaft 5 against the urging force of the spring 8. When the large-cassette detecting lever 4 swings further, the bottom face 10b of the cassette 10 comes to abut also on the abutting part 6c of the second opening member 6. At this point of time, the engaging part 6d of the second opening member 6 does not engage the engaging part 4d of the large-cassette detecting lever 4. Therefore, when the large cassette 10 is moved further downward as viewed on the drawing, the large-cassette detecting lever 4 and the second opening member 6 further swing against the urging force of the spring 8. When the cassette 10 moves to a predetermined extent, the lid 10a abuts on the fore end part 2a of the first opening member 2 to be caused to rotate clockwise, as shown in FIG. 6(c). When the large cassette 10 moves still further downward, the lid 10a comes into an open state with the large cassette 10 mounted on the reel mounts 111 and 112 (FIG. 1), as shown in FIG. 6(d). Further, in ejecting the large cassette 10, the large-cassette detecting lever 4 and the second opening member 6 are brought back to their original positions as shown in FIG. 6(a) by the urging force of the spring 8.

While the two large and small cassettes are arranged to be usable in the case of the embodiment described by way of example above, it is possible to handle cassettes of more than two different sizes by arranging an additional mechanism in the same manner as the lid opening mechanism 50.

Second Embodiment

A second embodiment of this invention is described with reference to FIG. 7 to FIGS. 9(a) to 9(d). In these figures, all parts that are the same as those of the first embodiment are indicated by the same reference numerals and the details of them are omitted from the following description. The second embodiment differs from the first embodiment in that the second opening member is arranged to engage the detecting lever in such a way as to have the second opening member act in association with the action of the detecting lever.

Figure 7:
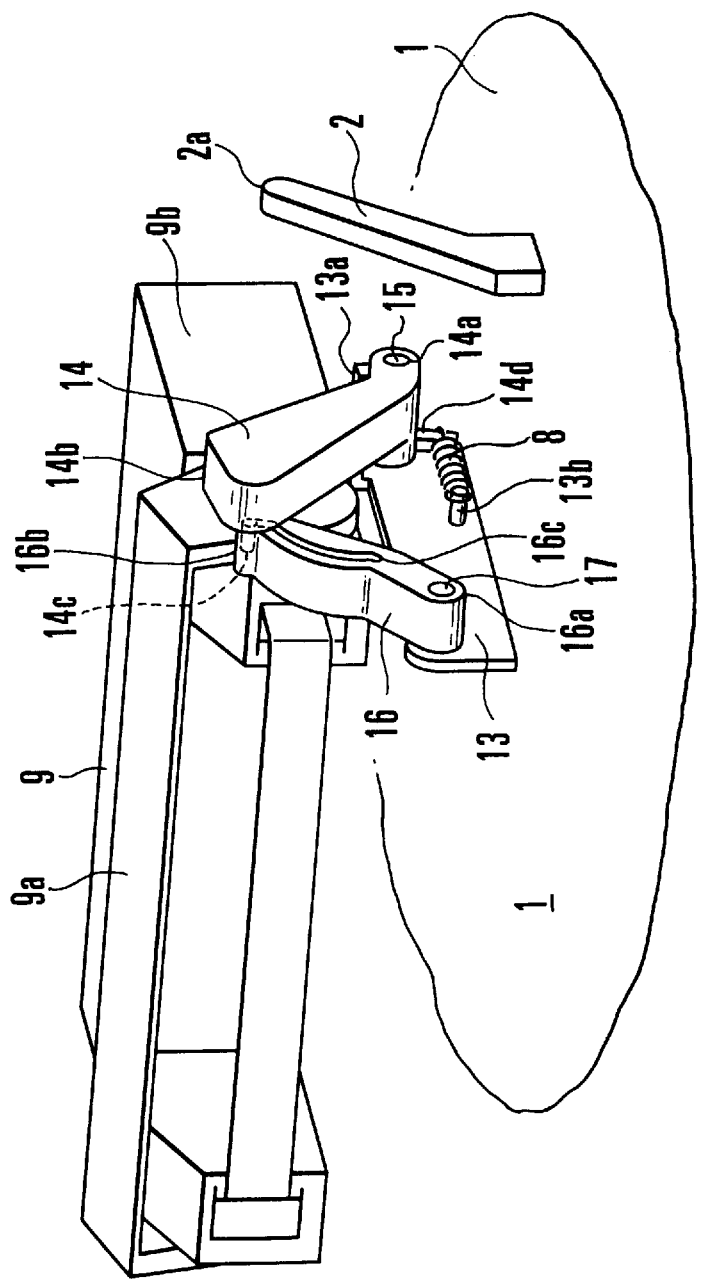
FIG. 7 is an oblique view showing the essential parts of a embodiment of this invention.

A fitting base 13 is secured to the upper surface of the chassis 1. A shaft 15 is secured to the fitting base 13. One end part 14a of a large-cassette detecting lever 14 is pivotally supported by the shaft 15. The clockwise swing of the large-cassette detecting lever 14, as viewed from the right-hand side in FIG. 7, is restricted by a bent part 13a which protrudes from an upper right end part of the fitting base 13. The detecting lever 14 is disposed in a position at a distance from one side face 9b of the small cassette 9. However, one end part 14b of the detecting lever 14 is arranged to be capable of abutting on the bottom face 10b of the large cassette 10 (see FIG. 4(b)). The detecting lever 14 has an engaging part 14c which is arranged in the neighborhood of the end part 14b to engage a second opening member 16.

One end part 16a of the second opening member 16 is pivotally supported by a shaft 17 which is secured to the fitting base 13. The second opening member 16 has an engaging groove 16c formed therein. The engaging part 14c of the detecting lever 14 engages the groove 16c of the second opening member 16. The middle part of the engaging groove 16c is formed in an arcuate shape to allow the detecting lever 14 to swing. The engaging groove 16c has groove parts which are formed in a shape protruding from both ends of the arcuate middle part. The second opening member 16 is thus arranged to act in association with the counterclockwise swinging action of the detecting lever 14 after the detecting lever 14 has moved to a predetermined extent. The clockwise swing of the second opening member 16 is restricted by the detecting lever 14 the clockwise swing of which is restricted by the bent part 13a of the fitting base 13. On the other hand, the counterclockwise swing of the second opening member 16 is restricted by the engaging part 14c of the detecting lever 14 which engages the protruding part of the engaging groove 16c of the second opening member 16. The other end part 16b of the second opening member 16 is arranged to abut on the lid 9a of the small cassette 9. The second opening member 16 is arranged to be capable of opening the lid 9a of the small cassette 9 as shown in FIG. 7 in a manner as will be described in detail later herein. A lock part 14d is formed to protrude from the end part 14a of the large-cassette detecting lever 14. A coiled spring 8 is stretched between this lock part 4d and a lock part 13b which protrudes from the fitting base 13.

Figure 8A:
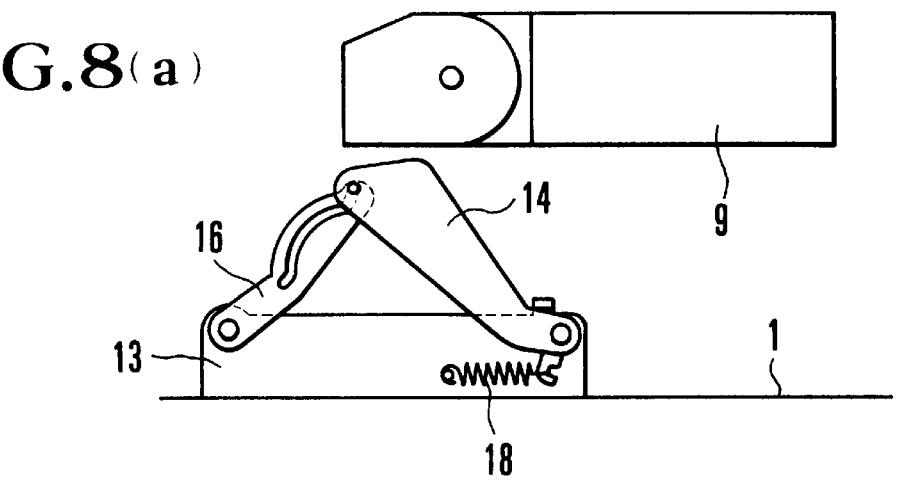
FIGS. 8(a) to 8(d) show the second embodiment as acting to open the lid of the small cassette.
Figure 8B:
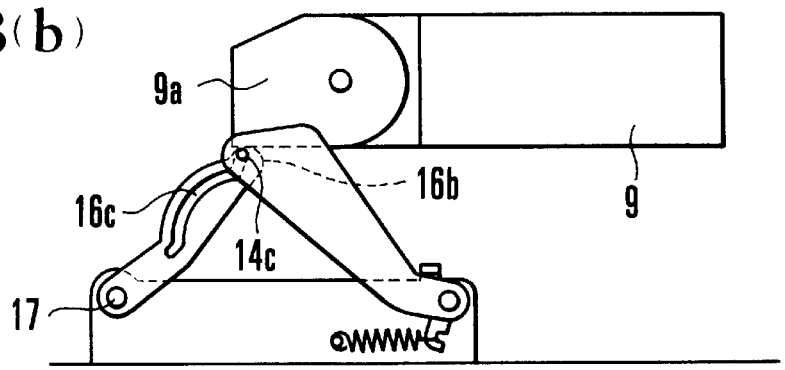

In mounting the small cassette 9 into the apparatus, the small-cassette lid opening mechanism operates as described below with reference to FIGS. 8(a) to 8(d):

Referring to FIG. 8(a), the small cassette 9 which is inserted into the cassette holder 121 (FIG. 1) is moved downward, as viewed on FIG. 8(a), to be mounted on the reel mounts 111 and 112 (FIG. 1) disposed on the chassis 1. The end part 16b of the second opening member 16 first comes to abut on the lid 9a of the small cassette 9, as shown in FIG. 8(b). The second opening member 16 then tries to swing clockwise on the shaft 7. However, since the engaging part 14c of the detecting lever 14 engages the end part of the engaging groove 16c, the clockwise swing of the second opening member 16 is restricted.

Figure 8C:
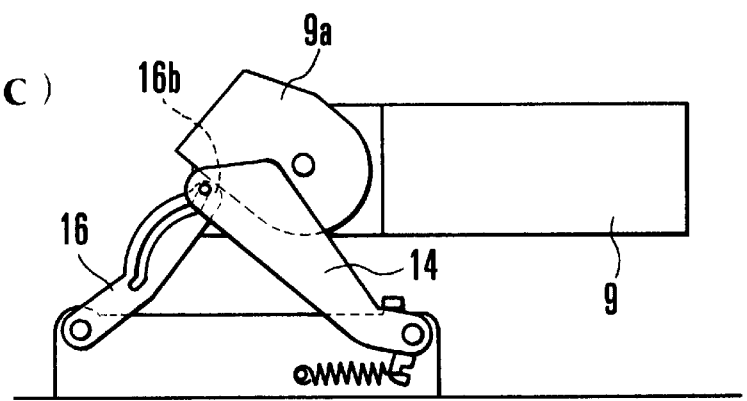
Figure 8D:
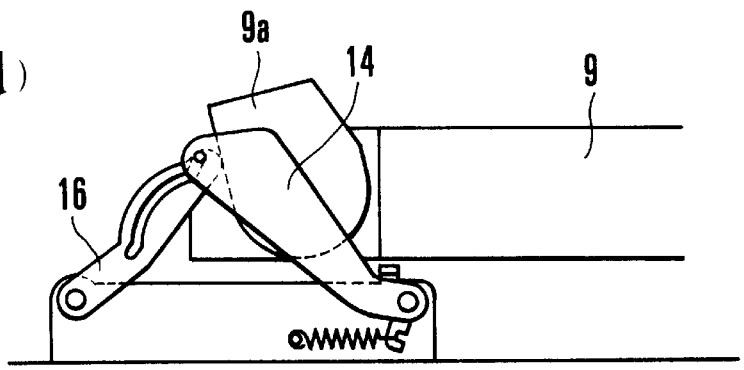

When the small cassette 9 further moves downward from the above-stated position, the lid 9a of the cassette 9 is pushed by the end part 16b of the second opening member 16 to rotate clockwise, as shown in FIG. 8(c). When the small cassette 9 is mounted on the reel mounts 111 and 112 (FIG. 1) by moving downward still further, the lid 9a comes into an open state, as shown in FIG. 8(d).

Figure 9A:
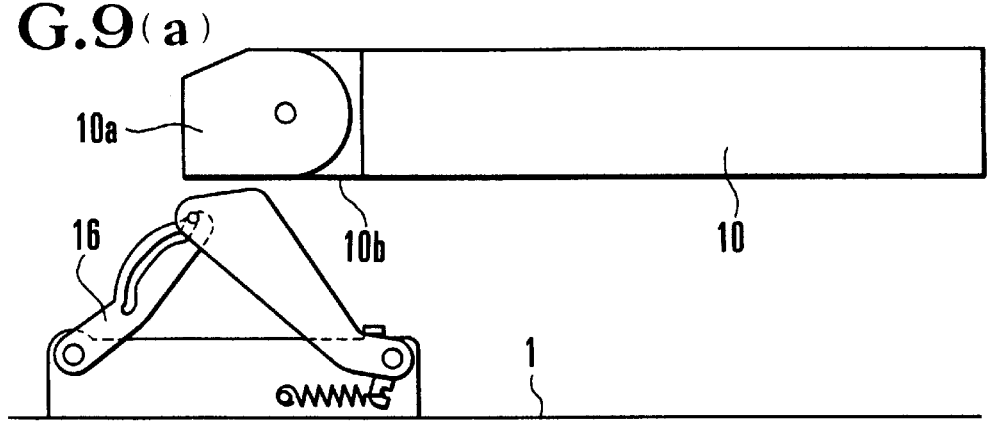
FIGS. 9(a) to 9(d) show the second embodiment as acting to open the lid of the large cassette.
Figure 9B:
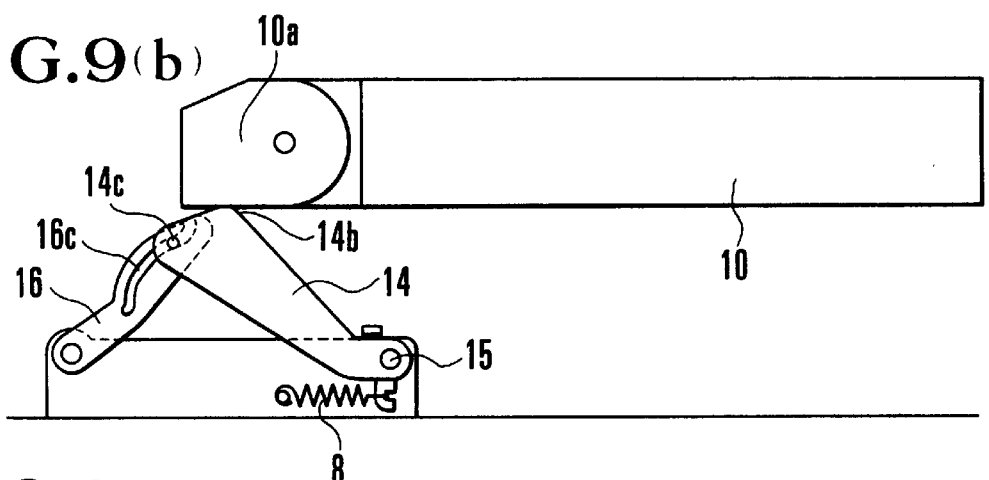
Figure 9C:
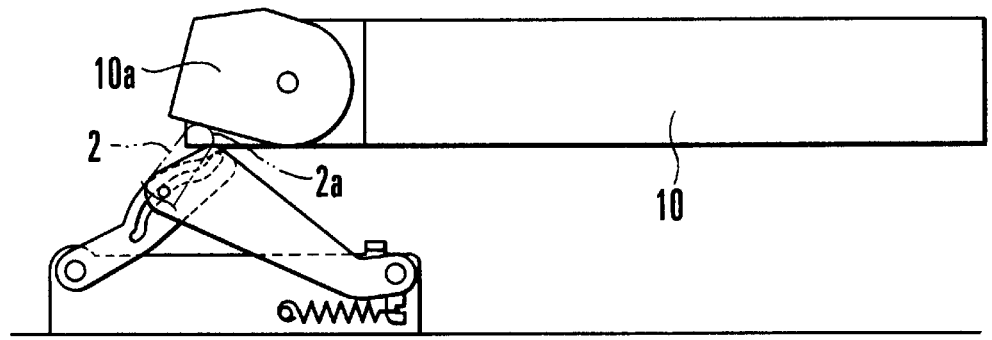
Figure 9D:
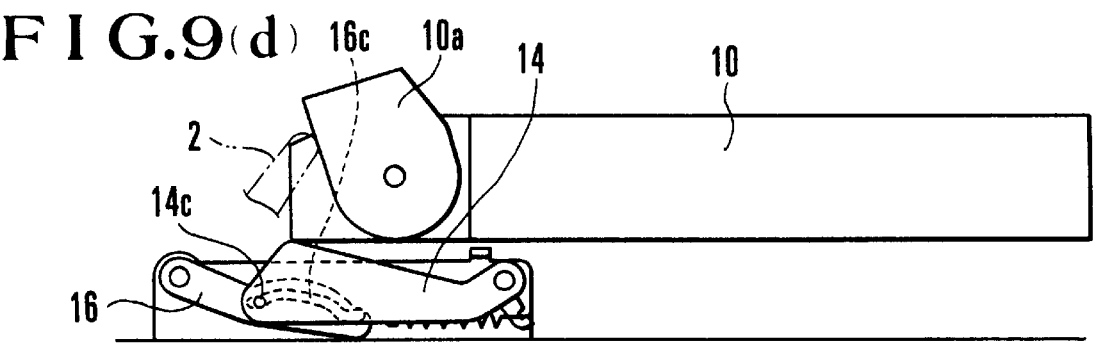

In mounting the large cassette 10 into the apparatus, the small-cassette lid opening mechanism operates as described below with reference to FIGS. 9(a) to 9(d):

Referring to FIG. 9(a), the large cassette 10 which is inserted into the cassette holder 121 (FIG. 1) is moved downward, as viewed on FIG. 9(a), to be mounted on the reel mounts 111 and 112 (FIG. 1) disposed on the chassis 1. The end part 14b of the large-cassette detecting lever 14 then first comes to abut on the bottom face 10b of the large cassette 10, as shown in FIG. 9(b). After that, the detecting lever 14 swings counterclockwise on the shaft 15 against the urging force of the spring 8. In the initial stage of the swinging action of the detecting lever 14, the engaging part 14c of the detecting lever 14 moves within the groove part protruding from the end of the arcuate middle groove part of the engaging groove 16c and, therefore, the second opening member 16 does not swing. However, when the detecting lever 14 further swings, the engaging part 14c comes out of the protruding groove part and comes to push the arcuate groove part and to cause the second opening member 16 to swing clockwise. When the large cassette 10 is moved further downward as shown in FIG. 9(b), the detecting lever 14 swings further against the urging force of the spring 8. In association with this action, the second opening member 16 also swings. When the large cassette 10 has moved to a predetermined extent, the fore end part 2a of the first opening member 2 abuts on the lid 10a of the large cassette 10, as shown in FIG. 9(c), to cause the lid 10a to rotate clockwise. When the large cassette 10 moves still further downward, as shown in FIG. 9(d), the large cassette 10 is mounted on the reel mounts 111 and 112. In this state, the lid 10a comes into an open state. Since the engaging part 14c of the detecting lever 14 then pushes the protruding end part of the engaging groove 16c, the second opening member 16 does not swing counterclockwise under this condition. Further, in ejecting the large cassette 10, the urging force of the spring 8 causes the detecting lever 14 and the second opening member 16 to come back to their original positions as shown in FIG. 9(a).

Third Embodiment

The following describes a third embodiment of this invention with reference to FIGS. 10 and 11(a) to 11(c). In FIGS. 10 and 11(a) to 11(c), the parts of the third embodiment that are arranged to act in the same manner as those of the first and second embodiments are indicated by the same reference numerals and the details of them are omitted from the following description. The third embodiment differs from the first and second embodiments in that a lever-like stopper is arranged to engage the second opening member and, when the large cassette is detected, the stopper is caused to swing by means of a solenoid.

A fitting base 23 which is secured to the chassis 1 has a shaft 25 secured to the fitting base 23. One end part 24a of the lever-like stopper 24 is pivotally supported by the shaft 25. The clockwise swing, as viewed from the right-hand side in FIG. 10, of the stopper 24 is limited by a bent part 23a which protrudes from the fitting base 23. Further, the stopper 24 is disposed in a position at a distance from one side face 9b and a lid 9a of the small cassette 9. The stopper 24 is provided with an engaging part 24c which protrudes from the other end part 24b of the stopper 24 and is arranged to engage the second opening member 26.

Figure 10:
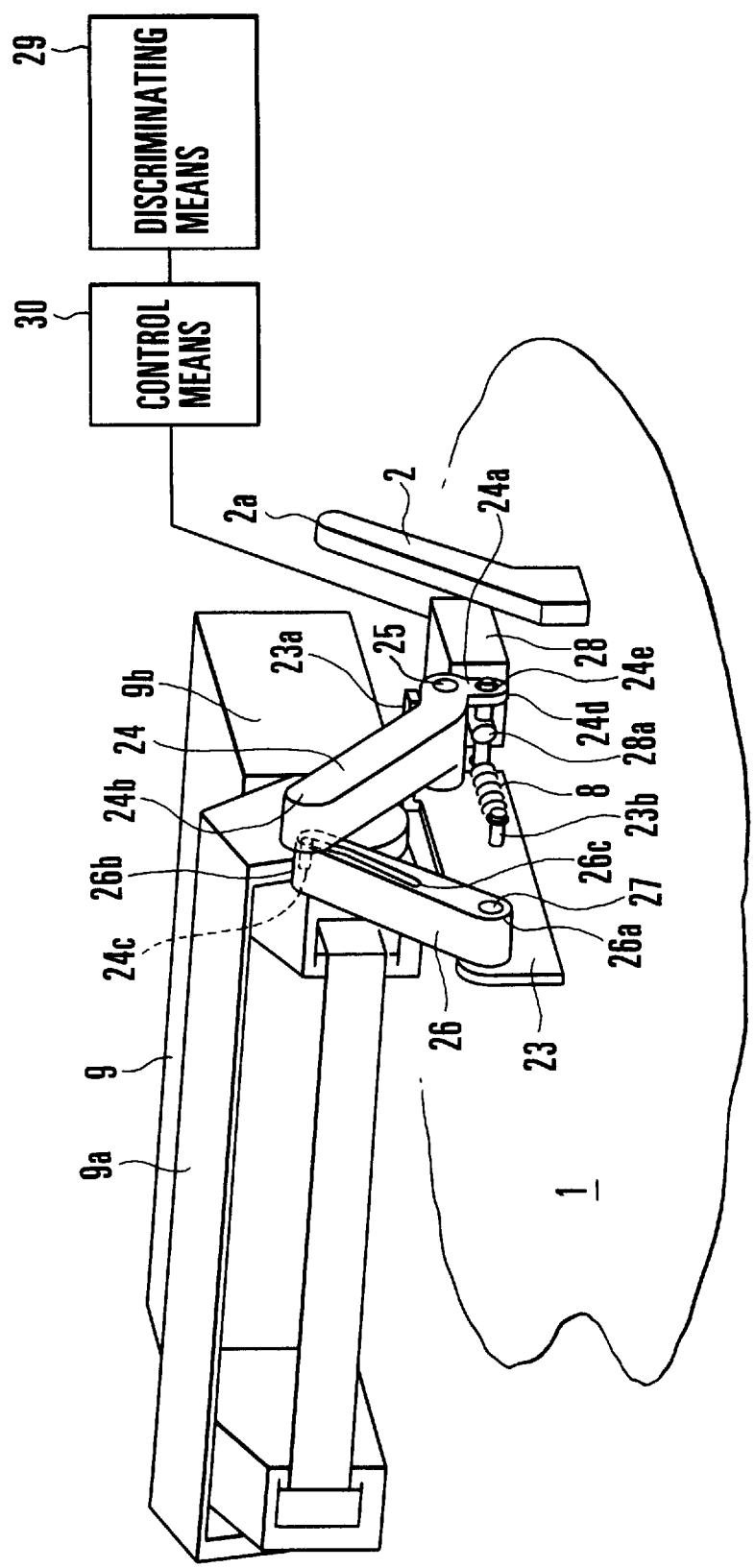
FIG. 10 is an oblique view showing the essential parts of a third embodiment of this invention.

The second opening member 26 has its one end part 26a pivotally supported by a shaft 27 which is secured to the fitting base 23. The second opening member 26 is provided with an engaging groove 26c which is arranged to engage the engaging part 24c of the stopper 24 and has its first and second linear parts formed approximately in an L-shape. The second opening member 26 is thus arranged to come to act in association with the counterclockwise swing of the stopper 24 after the stopper 24 has moved to a predetermined extent. Further, the clockwise swing of the second opening member 26 is restricted by the stopper 24 which has its clockwise swing restricted by the bent part 23a of the fitting base 23. The counterclockwise swing of the second opening member 26, on the other hand, is restricted by the engagement of the engaging part 24c of the stopper 24 with the first linear part of the engaging groove 26c of the second opening member 26. Further, the other end part 26b of the second opening member 26 is arranged to abut on the lid 9a of the small cassette 9. In a state as shown in FIG. 10, the lid 9a of the small cassette 9 can be opened, because the clockwise swing of the second opening member 26 is restricted by the stopper 24.

Further, a protruding end part 24d is formed to protrude from the end part 24a of the stopper 24. A slot 24e is formed in the protruding end part 24d. Meanwhile, a solenoid 28 is secured to the chassis 1. The solenoid 28 has a T-shaped fore end and has one end part of the output shaft 28a of the solenoid 28 engage the slot 24e. A coiled spring 8 is stretched between the other end part of the output shaft 28a of the solenoid 28 and a lock part 23b which protrudes from the fitting base 23. The solenoid 28 is connected to a control means 30, which controls the energized and deenergized states of the attracting force of the solenoid 28 on the basis of a result of discrimination made by a discriminating means 29. The discriminating means 29 makes a discrimination between the large and small sizes of the cassette loaded.

Figure 11A:
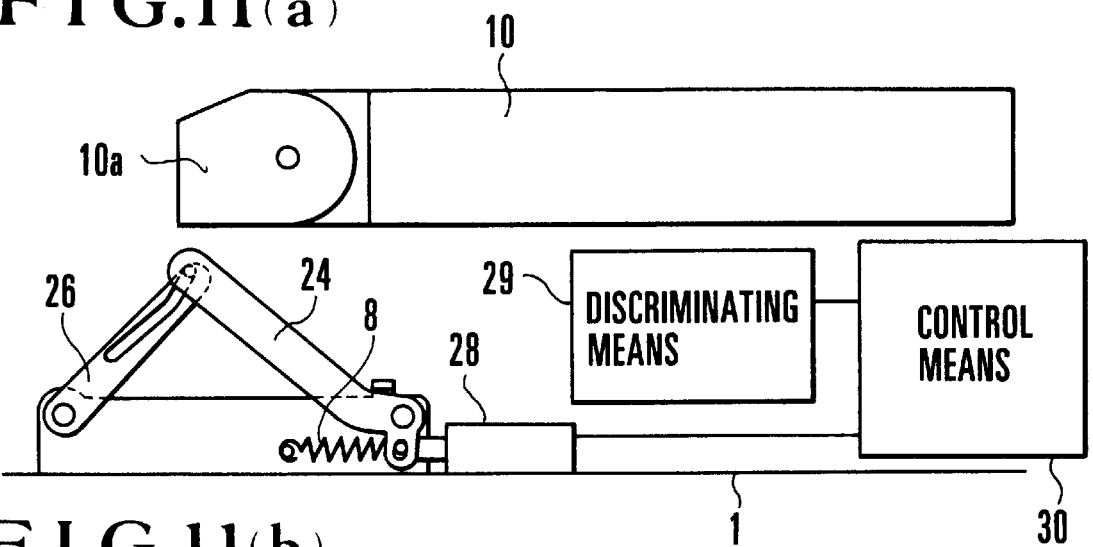
FIG. 11(a) to 11(c) show the third embodiment as acting to open the lid of the large cassette.
Figure 11B:
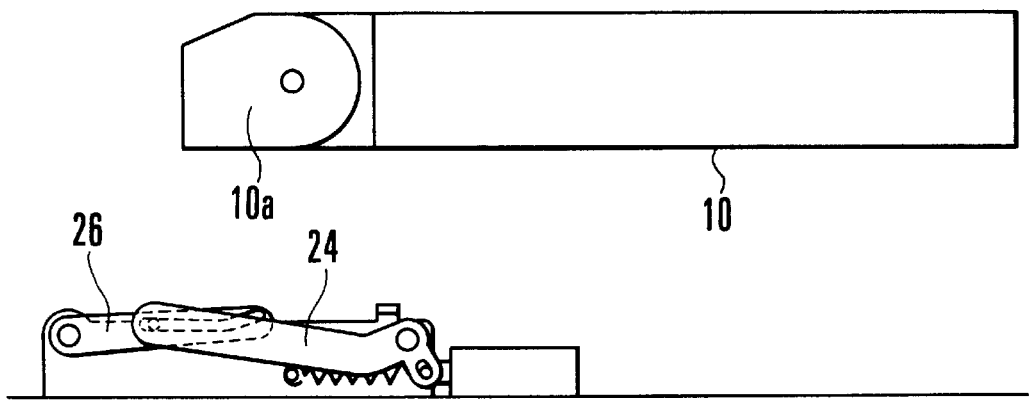
Figure 11C:
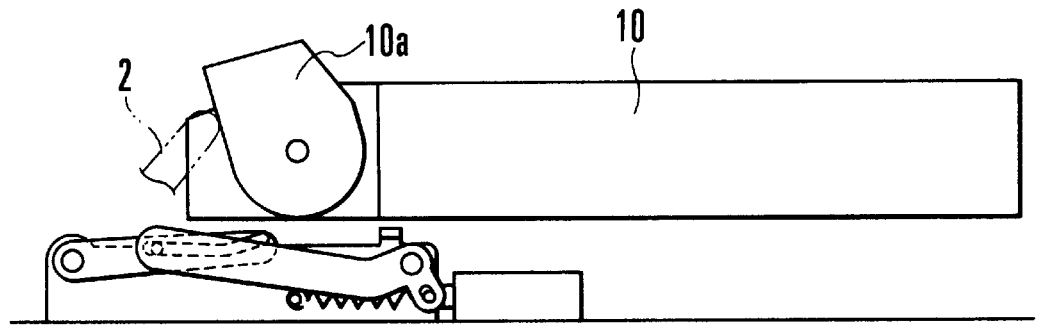

In mounting the large cassette 10 into the apparatus, the third embodiment operates as described below with reference to FIGS. 11(a) to 11(c):

Referring to FIG. 11(a), the size of the large cassette 10 which is inserted into the cassette holder 121 (FIG. 1) is discriminated by the discriminating means 29. The result of discrimination is transmitted to the control means 30. With the cassette thus determined to be the large cassette 10, the control means 30 causes the solenoid 28 to attract and move the stopper 24 counterclockwise against the urging force of the spring 8. The second opening member 26 swings clockwise in association with the movement of the stopper 24. FIG. 11(b) shows a state obtained after completion of the swinging movement. When this state is obtained, the cassette holder 121 is released from its locked state to be allowed to move downward as viewed on the drawing. In other words, the cassette holder 121 is arranged to be unlocked upon detection of completion of the attracting action of the solenoid 28. Further, in the event of a mechanism which is arranged to automatically move the cassette holder 121, a mechanism for locking the cassette holder 121 is not necessary. It is also possible to arrange the attracting action of the solenoid 28 to take place somewhat earlier than the moving action of the cassette holder 121. When the large cassette 10 is moved downward, as viewed on the drawing, from its position of FIG. 11(b), the lid 10a of the cassette 10 is rotated clockwise by the first opening member 2, as shown in FIG. 11(c).

When the cassette inserted is the small cassette 9, the clockwise swing of the second opening member 26 is restricted by the stopper 24 which is caused to swing by the urging force of the spring 8 with the solenoid 28 not operated to attract. Therefore, the lid 9a of the small cassette 9 is opened by the second opening member 26.

Further, the stopper 24 may be arranged to be driven by some other means such as a motor, instead of by the solenoid 28.

Each of the embodiments described is arranged to be capable of opening the lids of cassettes of different sizes using the respective dedicated members, to increase the latitude of arrangement for pulling out the tape contained in the cassette and to obviate the necessity of having any additional guide posts, so that an increase in cost and variations of tension can be easily suppressed.

What is claimed is:

1. A cassette lid opening device for a plurality of cassettes of different sizes, comprising:
   a) a first opening member for opening a lid of a first cassette by abutting on the lid of the first cassette, said first opening member being fixedly provided on said device;
   b) a second opening member for opening a lid of a second cassette which is smaller than the first cassette by abutting on the lid of the second cassette, said second opening member being movably provided on said device and being provided on said device at an inner position relative to the position at which said first opening member is provided; and
   c) moving means for detecting the first cassette by contact with the first cassette and moving said second opening member when detecting the first cassette.

2. A device according to claim 1, wherein said moving means is a swinging member having one end part thereof pivotally supported.

3. A device according to claim 2, wherein said second opening member is arranged to have one end part thereof pivotally supported to be swingable and to have an other end part engaging said swinging member.

4. A device according to claim 3, wherein said one end part of said swinging member and said one end part of said second opening member respectively have protruding parts, and an urging member is arranged between said protruding parts.

5. A device according to claim 3, wherein said swinging member has an end part which protrudes farther toward a mounted cassette than said other end part of said second opening member.

6. A device according to claim 1, wherein said moving means includes a swinging member, an actuator for causing said swinging member to swing, control means for controlling an action of said actuator, and discriminating means for discriminating whether an inserted cassette is the first cassette.

7. A device according to claim 6, wherein, when the inserted cassette is decided to be the first cassette by said discriminating means, said control means operates said actuator to cause said swinging member to move said second opening member in a direction in which the first cassette is mounted.

8. A device for opening a lid of a cassette, comprising:
  a) a lid opening member swingable with one end part thereof pivotally supported and for opening the lid of the cassette with an other end part thereof coming to abut on the lid; and
  b) a detecting member swingable with one end part thereof pivotally supported and having an other end part thereof engaging said lid opening member, said other end part of said detecting member having a portion formed to protrude farther toward a mounted cassette than said other end part of said lid opening member, and said device is constructed such that when said detecting member contacts said cassette, the engagement between said detecting member and said lid opening member is released.

9. A device according to claim 8, wherein said one end part of said detecting member and said one end part of said lid opening member respectively have protruding parts, and an urging member is arranged between said protruding parts.

10. An apparatus capable of selectively using a plurality of cassettes of different sizes, comprising:
  a) a cassette mounting mechanism permitting a selected cassette to be mounted into the apparatus by acting according to the size of the selected cassette; and
  b) a cassette lid opening mechanism including:
    a first opening member for opening a lid of a a first cassette by abutting on the lid of the first cassette when the first cassette is inserted into the apparatus, said first opening member being fixedly provided on said apparatus,
    a second opening member for opening a lid of a second cassette which is smaller than the first cassette by abutting on the lid of the second cassette when the second cassette is inserted into the apparatus, said second opening member being movably provided on said apparatus and being provided on said apparatus at an inner position relative to the position at which said first opening member is provided, and
    moving means for detecting the first cassette by contact with the first cassette and moving said second opening member when detecting the first cassette.

11. An apparatus according to claim 10, wherein said moving means is a swinging member having one end part thereof pivotally supported.

12. An apparatus according to claim 11, wherein said second opening member is arranged to have one end part thereof pivotally supported to be swingable and to have the other end part thereof engaging said swinging member.

13. An apparatus according to claim 12, wherein said one end part of said swinging member and said one end part of said second opening member respectively have protruding parts, and an urging member is arranged between said protruding parts.

14. An apparatus according to claim 12, wherein said other end part of said swinging member has a part which protrudes farther toward a mounted cassette than said other end part of said second opening member.

15. An apparatus according to claim 10, wherein said moving means includes a swinging member, an actuator for causing said swinging member to swing, control means for controlling an action of said actuator, and discriminating means for discriminating whether an inserted cassette is the first cassette.

16. An apparatus according to claim 15, wherein, when the inserted cassette is decided to be the first cassette by said discriminating means, said control means operates said actuator to cause said swinging member to move said second opening member in a direction in which the first cassette is mounted.

* * * * *

UNITED STATES PATENT AND TRADEMARK OFFICE
CERTIFICATE OF CORRECTION

PATENT NO. : 5,806,777
DATED : September 15, 1998
INVENTOR(S) : Junji Kobayashi

It is certified that error appears in the above-identified patent and that said Letters Patent is hereby corrected as shown below:

Col. 2, line 36, Delete " a plied" and insert --applied--.

Signed and Sealed this

Eighteenth Day of May, 1999

Attest:

Q. TODD DICKINSON

Attesting Officer

Acting Commissioner of Patents and Trademarks